UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING COMPOUNDS CONTAINING TUNGSTEN AND NITROGEN.

1,278,580.   Specification of Letters Patent.   Patented Sept. 10, 1918.

No Drawing.   Application filed November 11, 1912.  Serial No. 730,644.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in Producing Compounds Containing Tungsten and Nitrogen, of which the following is a specification.

We have discovered that nitrogen compounds of tungsten can be obtained from compounds containing tungsten and oxygen by heating them with a reducing gas and with nitrogen, provided that at least the treatment with nitrogen is effected under pressure. If desired, the treatment with reducing gas and nitrogen may take place simultaneously. It is advantageous if, during the reaction or at any rate toward the end thereof, a mixture of nitrogen and hydrogen be present and that some ammonia is formed owing to the catalytic action of the tungsten or compound thereof. The formation of the compounds containing tungsten and nitrogen then proceeds more easily and completely. The conditions of the reaction, such for instance as pressure, temperature, velocity of the gases, exclusion of contact poisons, should preferably be chosen so that the concentration of ammonia is not too low and, if desired, additions may be made to the tungsten compound in order to promote its activity as a catalytic agent.

The following example will serve to illustrate further the nature of our invention, which, however, is not confined to this example. The parts are by weight.

Pass a mixture of three volumes of hydrogen and one volume of nitrogen, at a pressure of 100 atmospheres and at a temperature of from 500° to 600° C., over an intimate mixture of ninety parts of tungstic acid (whether anhydrous or hydrated) and 10 parts of nickel oxid. When the gases leaving the apparatus contain at least one per cent. of ammonia by volume, allow the mass to cool, while maintaining the pressure, whereupon a compound containing tungsten and nitrogen is obtained.

Now what we claim is:—

1. The process of producing compounds containing tungsten and nitrogen by heating a compound of tungsten containing oxygen with a reducing gas and with nitrogen under pressure.

2. The process of producing compounds containing tungsten and nitrogen by heating a compound of tungsten containing oxygen with a mixture of nitrogen and hydrogen under pressure.

3. The process of producing compounds containing tungsten and nitrogen by heating a mixture of tungstic anhydrid and nickel oxid with a mixture of nitrogen and hydrogen at a pressure of about 100 atmospheres and at a temperature of from 500° to 600° C.

In testimony whereof we have hereunto set our hands in the presence of two subscribing witnesses.

CARL BOSCH.
ALWIN MITTASCH.

Witnesses:
J. ALEC. LLOYD,
JOSEPH HEIFFER.